US012629987B2

(12) United States Patent
Morishima et al.

(10) Patent No.: US 12,629,987 B2
(45) Date of Patent: May 19, 2026

(54) COOLING DEVICE FOR ELECTRICALLY DRIVEN VEHICLE

(71) Applicant: Mazda Motor Corporation, Aki-gun (JP)

(72) Inventors: Chinami Morishima, Aki-gun (JP); Kanichi Yamaguchi, Aki-gun (JP); Katsutoshi Taninaka, Aki-gun (JP)

(73) Assignee: Mazda Motor Corporation, Aki-gun (JP)

( * ) Notice: Subject to any disclaimer, the term of this patent is extended or adjusted under 35 U.S.C. 154(b) by 41 days.

(21) Appl. No.: 18/665,822

(22) Filed: May 16, 2024

(65) Prior Publication Data

US 2024/0424866 A1     Dec. 26, 2024

(30) Foreign Application Priority Data

Jun. 26, 2023     (JP) ................................ 2023-104014

(51) Int. Cl.
| | |
|---|---|
| B60H 1/32 | (2006.01) |
| B60H 1/00 | (2006.01) |
| B60K 11/02 | (2006.01) |
| B60L 58/26 | (2019.01) |

(52) U.S. Cl.
CPC ....... B60H 1/3205 (2013.01); B60H 1/00278 (2013.01); B60H 1/00507 (2013.01); *B60H 2001/006* (2013.01); *B60H 2001/325* (2013.01); *B60H 2001/3258* (2013.01);
(Continued)

(58) Field of Classification Search
CPC .............. B60H 1/3205; B60H 1/00278; B60H 1/00507; B60H 2001/006; B60H
2001/325; B60H 2001/3258; B60H
2001/3272; B60H 2001/3277; B60H
1/00385; B60H 1/00885; B60H 1/3216;
B60H 1/00; B60H 2001/003; B60H
2001/3292; B60H 1/00807; B60H 1/3227;
B60H 2001/3238; B60H 2001/3255;
B60H 2001/3294;
(Continued)

(56) References Cited

U.S. PATENT DOCUMENTS

| | | | | |
|---|---|---|---|---|
| 11,628,704 B2 * | 4/2023 | Bray | .................. | B60H 1/00885 |
| | | | | 454/69 |
| 2009/0002939 A1 * | 1/2009 | Baugh | .................... | G06F 1/206 |
| | | | | 361/679.48 |

(Continued)

FOREIGN PATENT DOCUMENTS

| | | |
|---|---|---|
| JP | H10196364 A | 7/1998 |

*Primary Examiner* — Hitesh Patel
(74) *Attorney, Agent, or Firm* — Alleman Hall LLP

(57)     ABSTRACT

When at least one of a first condition that a set compressor rotational speed is equal to or less than a compressor rotational speed limit set in advance based on a predetermined noise regulation value and a second condition that a set fan rotational speed is equal to or less than a fan rotational speed limit set in advance based on the predetermined noise regulation value is not satisfied, a cooling device sets a corrected compressor rotational speed such that noise generated with actuation of a compressor and a fan reaches the predetermined noise regulation value or less, and sets a corrected fan rotational speed based on the corrected compressor rotational speed. The cooling device sets a lower value of the corrected fan rotational speed for a higher corrected compressor rotational speed.

8 Claims, 10 Drawing Sheets

(52) U.S. Cl.
CPC ................ *B60H 2001/3272* (2013.01); *B60H 2001/3277* (2013.01); *B60K 11/02* (2013.01); *B60L 58/26* (2019.02)

(58) Field of Classification Search
CPC .... B60L 58/26; B60L 2240/545; B60L 1/003; B60L 2240/36; B60K 11/02
USPC .......................................................... 701/36
See application file for complete search history.

(56) References Cited

U.S. PATENT DOCUMENTS

| | | | |
|---|---|---|---|
| 2011/0146320 A1* | 6/2011 | Tomiyama ........... | B60H 1/3208 |
| | | | 62/296 |
| 2011/0176275 A1* | 7/2011 | Sato ................... | H05K 7/20836 |
| | | | 361/695 |
| 2012/0210741 A1* | 8/2012 | Fujiwara .......... | G10K 11/17881 |
| | | | 62/126 |
| 2015/0017492 A1* | 1/2015 | Takeuchi ................ | B60L 58/26 |
| | | | 429/62 |
| 2019/0178548 A1* | 6/2019 | Lin ....................... | F25B 49/027 |
| 2019/0219280 A1* | 7/2019 | Chitrala ................ | F25B 29/003 |
| 2021/0388752 A1* | 12/2021 | Chu ......................... | F01P 3/20 |
| 2023/0116964 A1* | 4/2023 | Sun .......................... | F24F 11/39 |
| | | | 700/276 |
| 2023/0356561 A1* | 11/2023 | Srichai ................. | B60H 1/3232 |
| 2025/0303818 A1* | 10/2025 | Zheng ................... | B60K 11/02 |

* cited by examiner

500

COOLING DEVICE FOR ELECTRICALLY DRIVEN VEHICLE

TECHNICAL FIELD

The technique disclosed herein belongs to a technical field relating to a cooling device for an electrically driven vehicle.

BACKGROUND ART

Conventionally, for cooling devices mounted on vehicles, studies are conducted on measures to suppress noise generated in cooling the coolant.

JPH10-196364A, for example, discloses a cooling fan control device where a coolant pressure reference fan rotational speed is set based on a current coolant pressure of an air conditioner, an upper limit guard rotational speed of a fan corresponding to the required air outlet temperature is set, and in the case where a vehicle is currently in a stopped state, where a current engine speed is an idle rotational speed, and where the coolant pressure reference fan rotational speed is larger than the upper limit guard rotational speed, the upper limit guard rotational speed is set as a fan rotational speed, and the coolant pressure reference fan rotational speed is set as the fan rotational speed in other cases.

SUMMARY OF INVENTION

Problems to be Solved by the Invention

A higher rotational speed of a compressor or a higher rotational speed of a fan causes a larger noise. Basically, a higher rotational speed of the compressor and a higher rotational speed of the fan are set for a higher required cooling capability. Examples of a scenario where a cooling device is required to have a high cooling capability include a situation in which a battery is quickly charged during a period in which a vehicle is in a stopped state and a situation of high load traveling, such as uphill traveling and towing traveling. Accordingly, large noise is generated in such situations. Particularly, in the case where the vehicle is an electrically driven vehicle that travels by using a drive motor as a main drive source, engine sound is not generated and hence, there is a concern that noise generated from the cooling device causes annoyance not only to people around the vehicle, but also to the occupant of the vehicle even during traveling.

The cooling fan control device described in JPH10-196364A, is expected to suppress noise by reducing the fan rotational speed to the upper limit guard rotational speed. However, a reduction in fan rotational speed causes a decrease in cooling capability. Therefore, there is room for improvement to achieve both high cooling capability and suppression of noise.

The technique disclosed herein has been made in view of such a point, and it is an object of the technique disclosed herein to suppress noise during cooling while a decrease in cooling capability is suppressed as much as possible.

Means for Solving the Problems

To solve the above-mentioned problem, a first mode of the technique disclosed herein is directed to a cooling device for an electrically driven vehicle, the cooling device configured to cool, by utilizing a coolant, an electric drive part mounted on a vehicle. The cooling device includes a compressor that compresses the coolant; a fan that draws outside air into a condensing device that condenses, by cooling, the coolant compressed by the compressor; an electric drive part temperature detector that detects a temperature of the electric drive part; a coolant pressure detector that detects a pressure of the coolant compressed by the compressor; and a controller that controls the compressor and the fan. The controller calculates a required cooling capability at least based on a detected result from the electric drive part temperature detector, the controller calculates a set compressor rotational speed, which is a rotational speed of the compressor based on the required cooling capability, and the controller calculates a set fan rotational speed, which is a rotational speed of the fan based on a detected result from the coolant pressure detector. When both of a first condition that the set compressor rotational speed is equal to or less than a compressor rotational speed limit set in advance based on a predetermined noise regulation value and a second condition that the set fan rotational speed is equal to or less than a fan rotational speed limit set in advance based on the predetermined noise regulation value are satisfied, the controller actuates the compressor and the fan at the set compressor rotational speed and the set fan rotational speed, respectively. When at least one of the first condition and the second condition is not satisfied, the controller sets a corrected compressor rotational speed such that noise generated with actuation of the compressor and the fan reaches the predetermined noise regulation value or less, and the controller sets a corrected fan rotational speed based on the corrected compressor rotational speed, and actuates the compressor and the fan at the corrected compressor rotational speed and the corrected fan rotational speed, respectively. the controller sets a lower value of the corrected fan rotational speed for a higher corrected compressor rotational speed.

That is, in the case where the rotational speed of the fan is set based on the pressure of coolant, a higher rotational speed of the fan is set for a higher rotational speed of the compressor. Therefore, noise tends to become higher than the noise regulation value when a high cooling capability is necessary in normal control. In view of the above, when it is expected that noise may become higher than the noise regulation value, the rotational speed of the fan is set not based on the pressure of coolant, but based on the rotational speed of the compressor. Particularly, a lower rotational speed of the fan is set for a higher rotational speed of the compressor.

A higher rotational speed of the compressor or a higher rotational speed of the fan causes a higher cooling capability. Therefore, by setting one of the rotational speed of the compressor and the rotational speed of the fan to a high rotational speed and by setting the other to a low rotational speed, it is possible to suppress a decrease in the cooling capability. Consequently, a combination of the corrected compressor rotational speed and the corrected fan rotational speed can be set to a combination that can suppress a decrease in the cooling capability as much as possible within a range where noise reaches the noise regulation value or less. As a result, noise is suppressed during cooling while a decrease in the cooling capability is suppressed as much as possible.

In a second mode of the technique disclosed herein, in the cooling device according to the first mode, the cooling device further includes an outside air temperature detector that detects a temperature of the outside air, and the controller sets the corrected compressor rotational speed and the corrected fan rotational speed by further taking into account the temperature of the outside air.

With this configuration, the temperature of outside air corresponds to the temperature of air drawn by the fan and hence, by taking into account the temperature of outside air, it is possible to set a more appropriate corrected fan rotational speed that can suppress a decrease in the cooling capability as much as possible. Consequently, it is possible to suppress noise during cooling while a decrease in the cooling capability is suppressed more effectively.

In the third mode of the technique disclosed herein, in the cooling device according to the first or second mode, the controller sets the corrected compressor rotational speed and the corrected fan rotational speed such that the generated noise reaches the noise regulation value.

With this configuration, it is possible to set the corrected compressor rotational speed and the corrected fan rotational speed to as high values as possible. Therefore, it is possible to suppress noise during cooling while a decrease in the cooling capability is suppressed more effectively.

In a fourth mode of the technique disclosed herein, in the cooling device according to the third mode, for a plurality of combinations of the rotational speed of the compressor and the rotational speed of the fan at which the generated noise reaches the noise regulation value, the controller obtains cooling capabilities and sets a combination, among the plurality of combinations, having a cooling capability closest to the required cooling capability for the corrected compressor rotational speed and the corrected fan rotational speed.

With this configuration, an appropriate corrected compressor rotational speed and an appropriate corrected fan rotational speed can be set within a range where noise can be suppressed. Consequently, it is possible to suppress noise during cooling while a decrease in the cooling capability is suppressed more effectively.

By selecting the combination of the rotational speed of the compressor and the rotational speed of the fan, the combination having the cooling capability closest to the required cooling capability, it is possible to suppress a situation in which an excessive cooling capability is exhibited. Consequently, it is possible to reduce power consumption as much as possible.

In a fifth mode of the technique disclosed herein, in the cooling device according to the fourth mode, when the combination includes a plurality of combinations having the cooling capability closest to the required cooling capability, the controller sets a combination, among the plurality of combinations, having a lowest rotational speed of the compressor for the corrected compressor rotational speed and the corrected fan rotational speed.

With this configuration, it is possible to set the rotational speed of the compressor to as low a value as possible. A lower rotational speed of compressor requires a smaller amount of coolant to be cooled and hence, it is possible to efficiently cool the coolant. Therefore, it is possible to enhance cooling efficiency.

In a sixth mode of the technique disclosed herein, in the cooling device according to the third mode, the controller calculates a first compressor rotational speed candidate and a first fan rotational speed candidate, the first compressor rotational speed candidate being higher than the compressor rotational speed limit by a fixed rotational speed, the first fan rotational speed candidate being based on the first compressor rotational speed candidate. The controller calculates a second compressor rotational speed candidate and a second fan rotational speed candidate, the second compressor rotational speed candidate being lower than the compressor rotational speed limit by a fixed rotational speed, the second fan rotational speed candidate being based on the second compressor rotational speed candidate. For a combination of the compressor rotational speed limit and the fan rotational speed limit, a combination of the first compressor rotational speed candidate and the first fan rotational speed candidate, and a combination of the second compressor rotational speed candidate and the second fan rotational speed candidate, the controller obtains cooling capabilities and the controller sets a combination, among the combinations, having a cooling capability closest to the required cooling capability for the corrected compressor rotational speed and the corrected fan rotational speed.

With this configuration, it is possible to reduce the amount of arithmetic operation of the controller as much as possible. Consequently, it is possible to suppress noise during cooling while a decrease in cooling capability is suppressed more effectively, and it is also possible to reduce power consumption as much as possible.

Advantageous Effects of Invention

As described above, according to the technique disclosed herein, in the cooling device for an electrically driven vehicle, it is possible to suppress noise during cooling while a decrease in cooling capability is suppressed as much as possible.

BRIEF DESCRIPTION OF DRAWINGS

FIGS. 6A and 6B are diagrams showing the relationship between noise regulation value and the cooling capability, wherein FIG. 6A shows a noise regulation line on a cooling capability map, and FIG. 6B shows the relationship between actuation point and the cooling capability on the noise regulation line.

MODE FOR CARRYING OUT THE INVENTION

Hereinafter, exemplary embodiments will be described in detail with reference to drawings.

Embodiment 1

Overall Configuration of Vehicle

Figure 1:
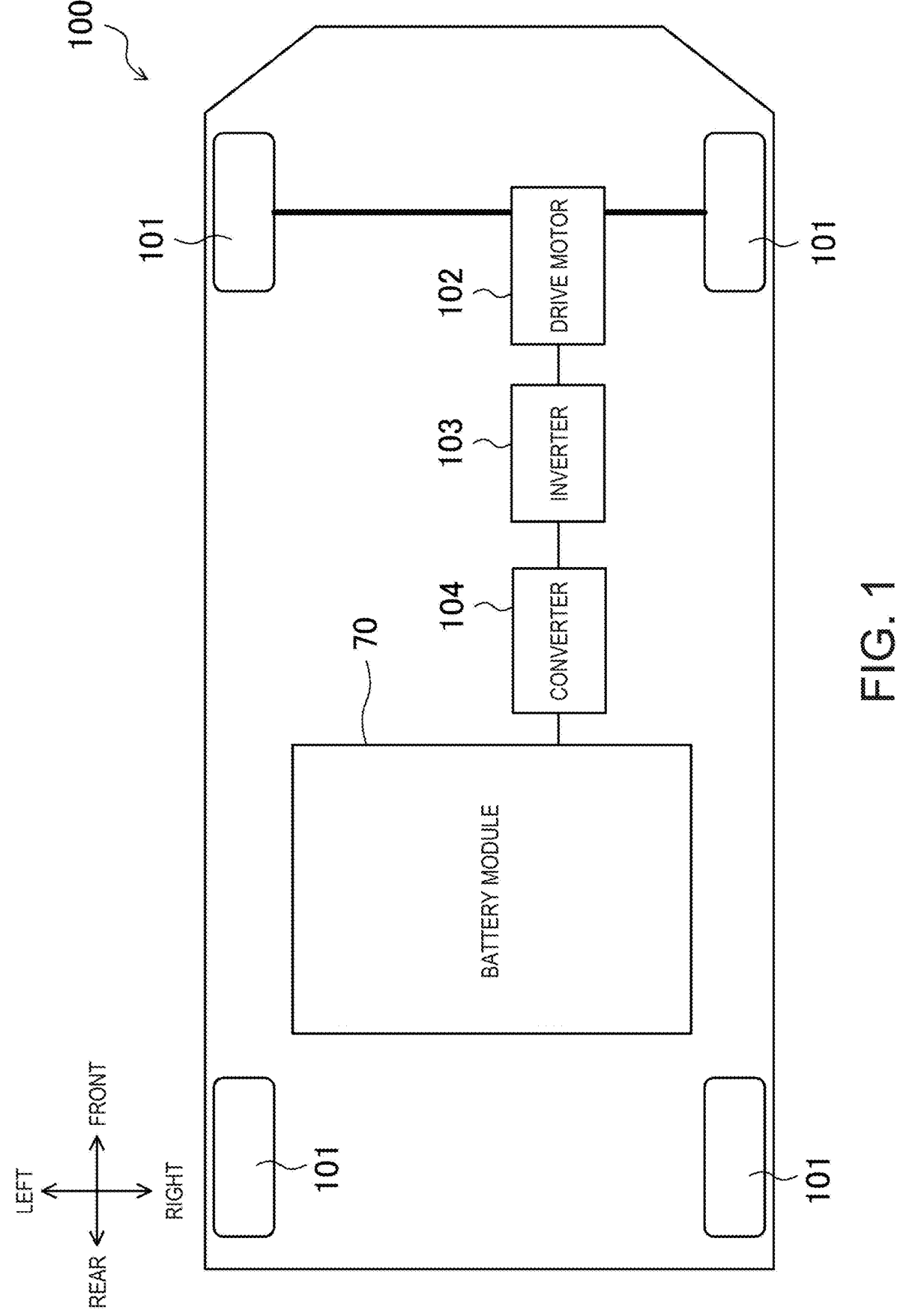
FIG. 1 is a configuration diagram of a vehicle according to an embodiment 1.

FIG. 1 shows a vehicle 100 including a cooling device 1 according to an embodiment 1. The vehicle 100 is an electrically driven vehicle that can travel mainly by a drive motor 102 that is rotated by power. The vehicle 100 is a vehicle, such as an electric automobile or a hybrid automobile, for example.

The vehicle 100 includes the drive motor 102. The rotation of the drive motor 102 is transferred to two wheels of four wheels 101 via a shaft, the two wheels being located on the front side. This transmission causes the vehicle 100 to move (travel). The drive motor 102 is a motor generator, and serves as a power generator during deceleration (regeneration) of the vehicle 100.

The drive motor 102 is connected to a battery module 70 via an inverter 103 and a converter 104.

The battery module 70 is formed by stacking a plurality of battery cells having a rectangular box shape (not shown in the drawing). The battery module 70 is disposed below the floor panel of the vehicle 100. The battery cell is a lithium-ion battery or a nickel-hydrogen battery, for example.

The inverter 103 converts direct current (DC) power into alternating current (AC) power. During traveling of the vehicle 100, the inverter 103 converts DC power, supplied via the converter 104, into AC current with three different phases, and supplies the AC current to the drive motor 102. During regeneration of the vehicle 100, the inverter 103 converts AC power, generated by the drive motor 102, into DC power, and supplies the DC power to the converter 104.

During traveling of the vehicle 100, the converter 104 lowers DC power, outputted from the battery module 70, to a driving voltage of the drive motor 102, and supplies the power to the inverter 103. During regeneration of the vehicle 100, the converter 104 raises DC power, supplied from the inverter 103, and charges the battery module 70 with the power.

The drive motor 102, the inverter 103, the converter 104, and the battery module 70 are examples of electric drive parts mounted on the vehicle 100.

Overall Configuration of Cooling Device

Figure 2:
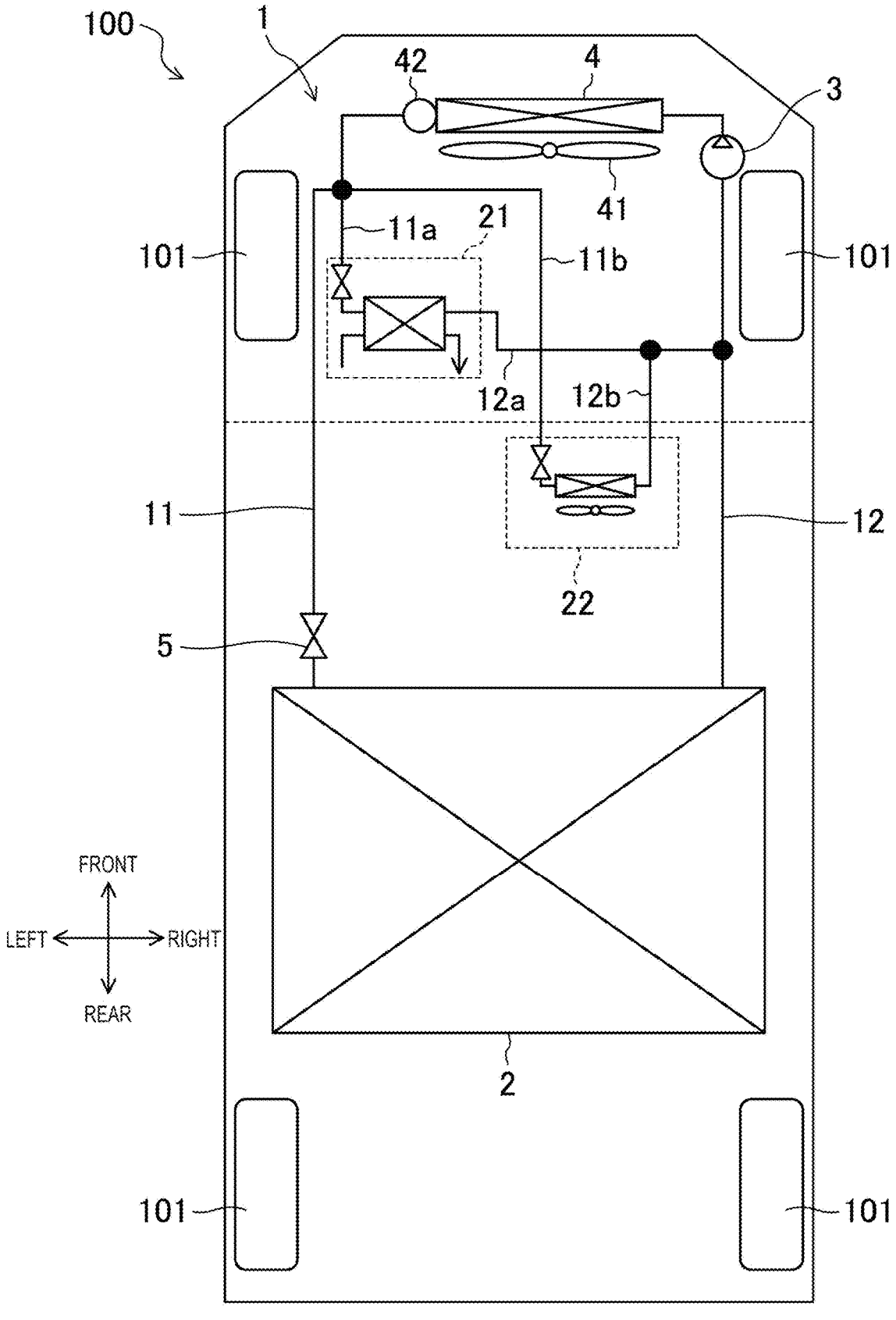
FIG. 2 is a configuration diagram of a cooling device.

FIG. 2 shows the cooling device 1 mounted on the vehicle 100. The cooling device 1 can cool the electric drive parts. The cooling device 1 can directly cool, for example, the battery module 70 by an endothermic reaction that occurs at the time of a phase change from liquid coolant to gas coolant. The cooling device 1 can indirectly cool the drive motor 102 by coolant via a cooling water cooling mechanism 21, which will be described later. The coolant is, for example, HFO (hydrofluoroolefin) coolant, and is specifically R1234yf.

The cooling device 1 includes a battery heat exchanger 2, a compressor 3, and a condenser 4, the heat exchanger 2 causing coolant and the battery module 70 to exchange heat, the compressor 3 compressing the coolant that flows out from the battery heat exchanger 2, the condenser 4 condensing, by cooling, the coolant compressed by the compressor 3. The cooling device 1 includes the cooling water cooling mechanism 21 and an air conditioner 22, the cooling water cooling mechanism 21 cooling coolant that cools the drive motor 102, the air conditioner 22 being utilized for performing air conditioning in a vehicle cabin. The cooling device 1 has a main inflow path 11, a first branch inflow path 11a, and a second branch inflow path 11b, the main inflow path 11 being a coolant path directing toward the battery heat exchanger 2 from the condenser 4, the first branch inflow path 11a being branched from the main inflow path 11 and directing toward the cooling water cooling mechanism 21, the second branch inflow path 11b being branched from the main inflow path 11 and directing toward the air conditioner 22. The cooling device 1 has a main outflow path 12, a first branch outflow path 12a, and a second branch outflow path 12b, the main outflow path 12 being a coolant path directing toward the compressor 3 from the battery heat exchanger 2, the first branch outflow path 12a directing toward the main outflow path 12 from the cooling water cooling mechanism 21, the second branch outflow path 12b directing toward the main outflow path 12 from the air conditioner 22. The cooling device 1 also includes an expansion valve 5 provided in the main inflow path 11 to reduce the pressure of coolant condensed by the condenser 4.

The compressor 3 compresses the coolant subjected to heat exchange with the battery module 70. The compressor 3 is, for example, a scroll compressor, and can adjust the pressure of coolant that flows out from the compressor 3 by adjusting rotational speed. To be more specific, a higher compressor rotational speed causes a higher pressure of coolant that is caused to flow out from the compressor 3. In other words, a higher compressor rotational speed causes a larger amount of coolant that is caused to flow out from the compressor 3. When coolant is compressed by the compressor 3, the temperature of the coolant rises due to adiabatic compression.

The condenser 4 is disposed at the front portion of the vehicle 100. A fan 41 is provided behind the condenser 4 on the vehicle. During traveling of the vehicle 100, the condenser 4 cools coolant by traveling air or by a combination of traveling air and air drawn by the rotation of the fan 41. In contrast, during a period in which the vehicle 100 is in a stopped state, the condenser 4 cools coolant by air drawn by the rotation of the fan 41. In the condenser 4, the pressure of coolant is not reduced, but the temperature of the coolant is reduced, so that the coolant is condensed and liquified.

In the embodiment 1, the fan 41 is a motor-driven fan. The fan 41 includes a small-sized electric motor (not shown in the drawing), and rotates by the rotation of the electric motor. A higher rotational speed of the fan 41 causes the fan 41 to draw a larger amount of air. To be more specific, the air volume of the fan 41 is directly proportional to the rotational speed of the fan.

A receiver tank 42 is provided downstream of the condenser 4. The receiver tank 42 temporarily stores coolant liquefied by the condenser 4. The receiver tank 42 is connected to the main inflow path 11. When coolant liquefied by the condenser 4 flows into the receiver tank 42, coolant flows out from the receiver tank 42 to the main inflow path 11 by an amount corresponding to the amount of the coolant that flows into the receiver tank 42.

The expansion valve 5 reduces the pressure of coolant in the main inflow path 11, and causes the coolant to flow into the battery heat exchanger 2. The temperature of the coolant that passes through the expansion valve 5 is reduced due to adiabatic expansion. Further, due to a reduction in pressure caused by the expansion valve 5, the saturation temperature (corresponding to the boiling point) is reduced. A reduction in pressure of coolant caused by the expansion valve 5 slows the flow of coolant in the heat exchanger 2 and hence, the coolant in the heat exchanger 2 evenly exchanges heat with the battery module 70.

The expansion valve 5 is also utilized for adjusting the flow rate of coolant that is caused to flow into the battery heat exchanger 2. To be more specific, while a larger opening of the expansion valve 5 causes a higher flow rate of coolant that flows into the battery heat exchanger 2, a smaller opening of the expansion valve 5 causes a lower flow rate of coolant that flows into the battery heat exchanger 2.

The cooling water cooling mechanism 21 includes an expansion valve and a heat exchanger. The expansion valve is provided in the first branch inflow path 11a.

The air conditioner 22 includes an expansion valve, a heat exchanger, and a fan. The expansion valve is provided in the second branch inflow path 11b. The rotational speed of the fan is set based on a target temperature in a vehicle cabin.

Control System of Cooling Device

Next, the control system of the cooling device 1 will be described.

Figure 3:
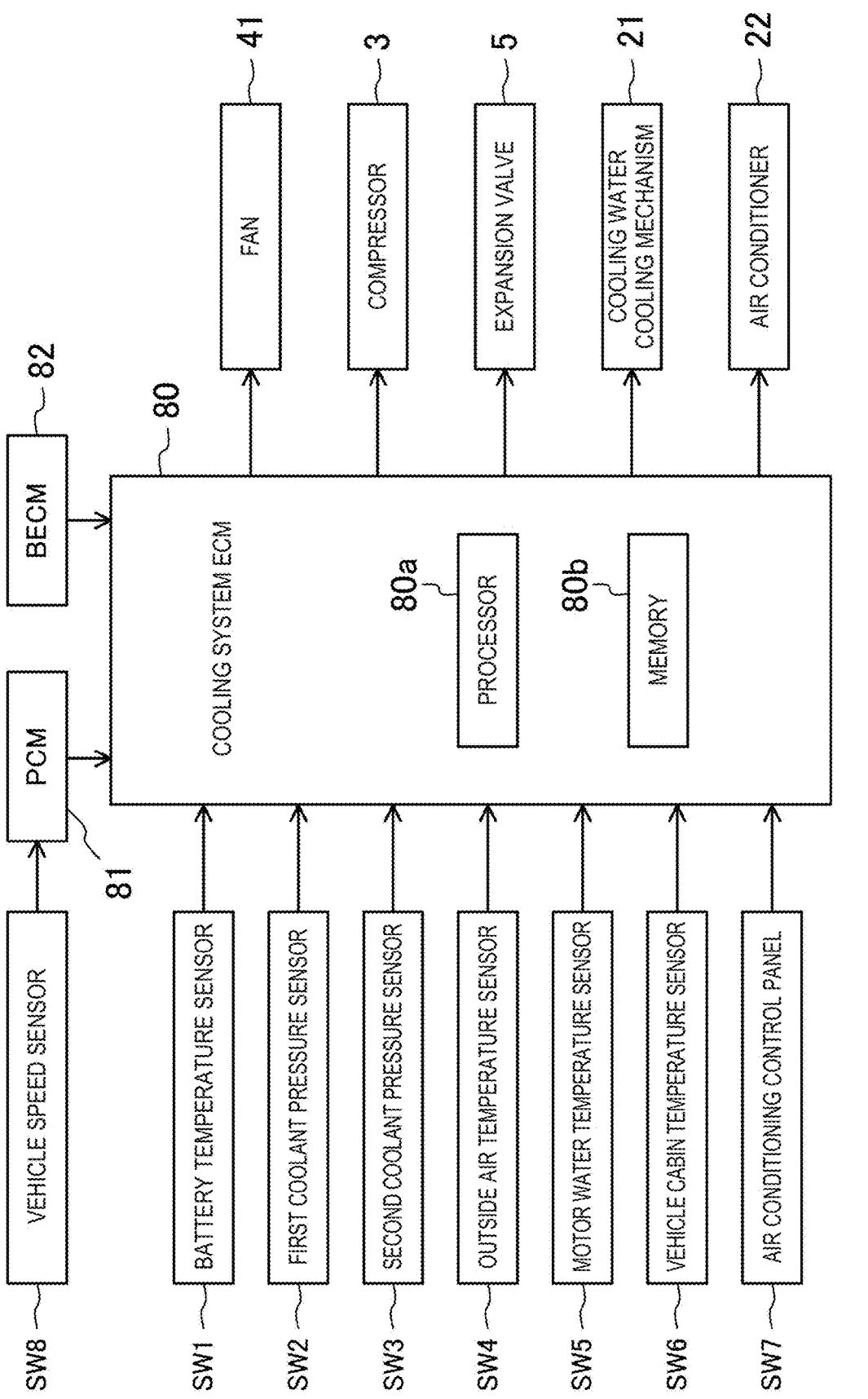
FIG. 3 is a block diagram showing a control system of the cooling device.

As shown in FIG. 3, the vehicle 100 includes a cooling system ECM (Electric Control Module) 80 being a controller that mainly performs control of the cooling device 1. The cooling system ECM 80 includes one or more processors 80a and memory 80b, each of the one or more processors 80a including a central processing unit (CPU), the memory 80b including ROM and RAM, and storing various programs. The memory 80b may be nonvolatile memory, for example. The programs relating to control performed by the cooling system ECM 80 are stored in the memory 80b. The cooling system ECM 80 is performed by the processor 80a reading the program stored in the memory 80b.

The cooling system ECM 80 receives inputs of signals from a battery temperature sensor SW1, a first coolant pressure sensor SW2, a second coolant pressure sensor SW3, an outside air temperature sensor SW4, a motor water temperature sensor SW5, a vehicle cabin temperature sensor SW6, and an air conditioning control panel SW7, the battery temperature sensor SW1 detecting the temperature of the battery cell, the first coolant pressure sensor SW2 detecting the pressure of coolant that flows into the compressor 3, the second coolant pressure sensor SW3 detecting the pressure of coolant before flowing into the condenser 4, the coolant being compressed by the compressor 3, the outside air temperature sensor SW4 detecting the temperature of outside air, the motor water temperature sensor SW5 detecting the water temperature of cooling water for the drive motor 102, the vehicle cabin temperature sensor SW6 detecting a temperature in the vehicle cabin, the air conditioning control panel SW7 controlling air conditioning in the vehicle cabin. The cooling system ECM 80 also receives inputs of signals from a PCM (Powertrain Control Module) 81 and a BECM (Battery Energy Control Module) 82, the PCM 81 being a controller that performs control of the entire power system of the vehicle 100, the BECM 82 being a controller that performs control of charging and discharging of the battery module 70. A signal from a vehicle speed sensor SW8 is inputted to the PCM 81. Although not shown in the drawing, each of the PCM 81 and the BECM 82 includes a processor and a memory.

The battery temperature sensor SW1 is disposed on the battery module 70 at a position in the vicinity of an outflow port for coolant, for example. The first coolant pressure sensor SW2 is disposed in the main outflow path 12 at a position upstream of the compressor 3. The second coolant pressure sensor SW3 is disposed at a position downstream of the compressor 3 and upstream of the condenser 4. The outside air temperature sensor SW4 is disposed on the front side of the condenser 4 on the vehicle. The temperature of outside air detected by the outside air temperature sensor SW4 corresponds to the temperature of air drawn by the fan 41. The motor water temperature sensor SW5 faces the cooling water passage of the drive motor 102. The water temperature detected by the motor water temperature sensor SW5 is assumed as the temperature of the drive motor 102. The air conditioning control panel SW7 is a panel manipulated by an occupant of the vehicle 100, and is provided with a switch that controls ON and OFF of air conditioning, a switch that sets the air volume of air, a switch that sets a target temperature in the vehicle cabin, and other switches. A plurality of battery temperature sensors SW1 may be provided. For example, another battery temperature sensor SW1 may be provided at the center of the battery module 70 as viewed in a plan view in addition to the battery temperature sensor SW 1 provided to the battery module 70 at a position in the vicinity of the outflow port for coolant. The battery temperature sensor SW1 and the motor water temperature sensor SW5 are examples of electric drive part temperature detectors.

The cooling system ECM 80 controls the fan 41, the compressor 3, the expansion valve 5, the cooling water cooling mechanism 21, and the air conditioner 22 based on signals from the respective sensors SW1 to SW7, a signal from the PCM 81, and a signal from the BECM 82. To be more specific, the cooling system ECM 80 obtains information relating to vehicle speed from the PCM 81, obtains information relating to target temperatures of cooling targets (the drive motor 102 and the battery module 70) from the BECM 82, and obtains information relating to a target temperature in the vehicle cabin from the air conditioning control panel SW7. The cooling system ECM 80 compares detected results from the battery temperature sensor SW1, the motor water temperature sensor SW5, and the vehicle cabin temperature sensor SW6 with the respective target temperatures to calculate a required cooling capability Qr of the cooling device 1. The cooling system ECM 80 sets a compressor rotational speed based on the required cooling capability Qr. The cooling system ECM 80 calculates the air volume to be supplied to the condenser 4 based on the detected result from the second coolant pressure sensor SW3, and sets a fan rotational speed based on the air volume. The cooling system ECM 80 causes each of the compressor 3 and the fan 41 to rotate at the rotational speed set for each of the compressor 3 and the fan 41, and adjusts the opening of the expansion valve 5, the opening of the expansion valve of the cooling water cooling mechanism 21, and the opening of the expansion valve of the air conditioner 22 in such a way as to allow coolant to flow into each valve at a necessary flow rate. The cooling system ECM 80 also adjusts the rotational speed of the fan of the air conditioner 22 according to the target temperature in the vehicle cabin. The cooling capability may be, for example, a heat capacity at which coolant can absorb heat per unit time.

The cooling system ECM 80 also calculates the air volume of traveling air based on the information relating to the vehicle speed obtained from the PCM 81. In setting a fan rotational speed, the cooling system ECM 80 takes into account the air volume of traveling air. To be more specific, the cooling system ECM 80 sets a fan rotational speed such that an air volume, being the deficit obtained by subtracting an air volume obtained from traveling air from the air volume to be supplied to the condenser 4, can be obtained by the fan 41. When all of the air volume of air to be supplied to the condenser 4 can be obtained from traveling air, the cooling system ECM 80 may set the fan rotational speed to zero, causing the fan 41 not to rotate.

Cooling Capability Map

Next, the cooling capability of the cooling device 1 will be described.

As described above, the condenser 4 cools coolant by utilizing at least one of traveling air and air drawn by the fan 41. That is, the condenser 4 cools coolant by utilizing outside air. Therefore, the cooling capability of the cooling device 1 depends on the temperature of outside air.

Figure 4:
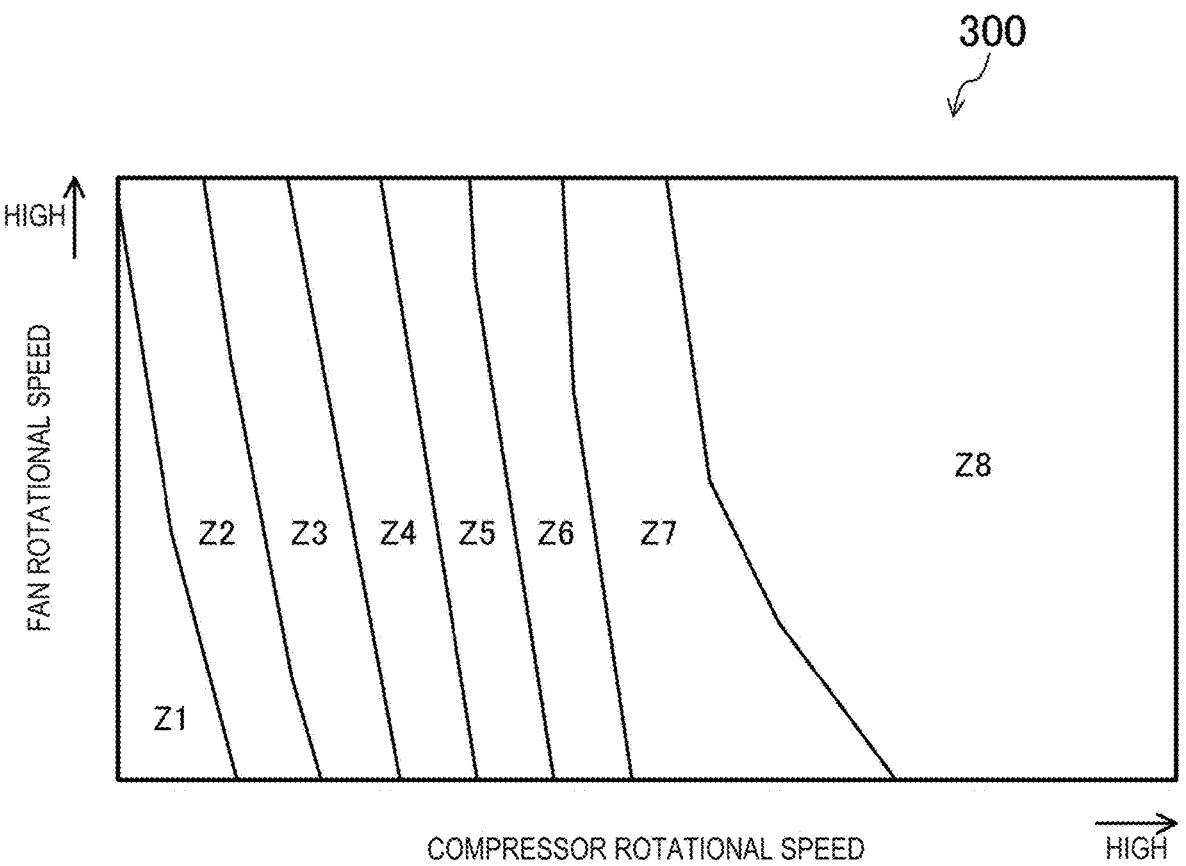
FIG. 4 is a map showing the relationship between the rotational speed of a compressor, the rotational speed of a fan, and cooling capability, and shows the relationship for which the temperature of outside air is relatively low.
Figure 5:
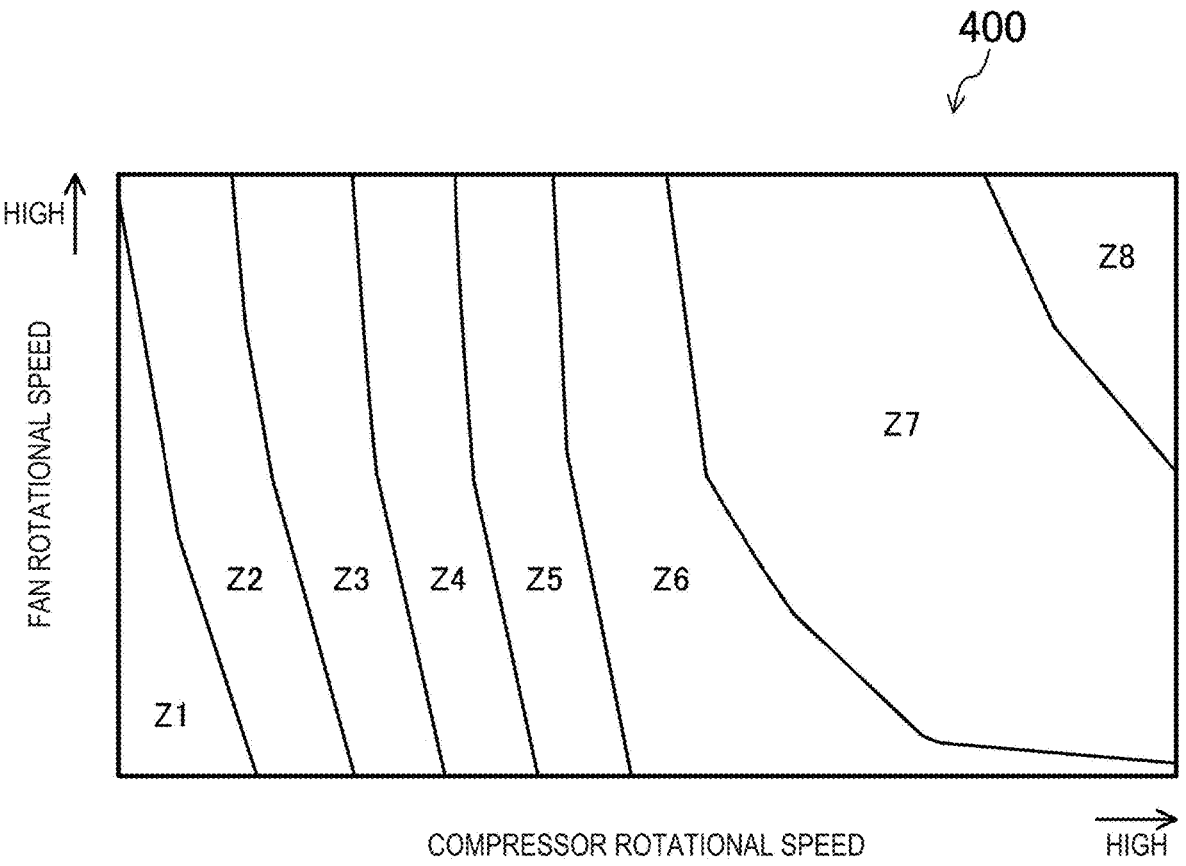
FIG. 5 is a map showing the relationship between the rotational speed of the compressor, the rotational speed of the fan, and the cooling capability, and shows the relationship for which the temperature of outside air is relatively high.

FIG. 4 and FIG. 5 show cooling capability maps of the cooling device 1. FIG. 4 is a low temperature cooling capability map 300 for which the temperature of outside air is relatively low, and FIG. 5 is a high temperature cooling capability map 400 for which the temperature of outside air is relatively high. The low temperature and high temperature cooling capability maps 300, 400 are stored in the memory 80b. Although only two cooling capability maps are exemplified in this embodiment, in practice, three or more cooling capability maps are stored in the memory 80b for temperatures of outside air.

In the low temperature and high temperature cooling capability maps 300, 400, compressor rotational speed is shown on the horizontal axis, and fan rotational speed is shown on the vertical axis. Regions Z1 to Z8 are regions having similar cooling capabilities. The region Z1 has the lowest cooling capability, the region Z8 has the highest cooling capability, and the regions Z2 to Z7 have a higher cooling capability as the regions come closer to the region Z8. Boundary lines between the respective regions Z1 to Z8 are lines at which the cooling capability is equal. Basically, a higher compressor rotational speed and a higher fan rotational speed cause a larger cooling capability and hence, in each of the regions Z1 to Z8, the cooling capability increases as a position goes away from the boundary line on the lower side toward the upper right side.

When the low temperature cooling capability map 300 is compared with the high temperature cooling capability map 400, it can be understood that the region Z8 has a larger area in the low temperature cooling capability map 300 than the high temperature cooling capability map 400. This means that higher cooling efficiency can be obtained by outside air having a lower temperature. That is, due to constraints of an abnormal operation, such as choking, and of noise, which will be described later, there are limitations on the rotational speeds of the compressor 3 and the fan 41. It can be regarded that having a large region of high cooling capability means that even a limited rotational speed can cause the high cooling capability to be exhibited, that is, can increase cooling efficiency.

Noise Suppression Control

When the cooling device 1 is operated, noise is generated. Noise is generated mainly due to the operation of the compressor 3 and the fan 41. A higher compressor rotational speed and a higher fan rotational speed cause a larger noise. As described above, a higher rotational speed of the compressor 3 and a higher rotational speed of the fan 41 cause a larger cooling capability of the cooling device 1 and hence, when an attempt is made to cause the cooling device 1 to exhibit the high cooling capability, large noise is generated. That is, the cooling capability and noise have a trade-off relationship.

Examples of a scene where the cooling device 1 is required to have the high cooling capability include a scene where the battery module 70 is quickly charged during a period in which the vehicle 100 is in a stopped state and a scene of high load traveling, such as uphill traveling and towing traveling. Accordingly, large noise is generated in such scenes. Particularly, as in the case of the embodiment 1, in the case where the vehicle 100 is an electrically driven vehicle that can travel by using the drive motor 102 as a main drive source, an engine sound is not generated and hence, there is a concern that noise generated from the cooling device 1 causes annoyance not only to people around the vehicle 100, but also to the occupant of the vehicle 100 even during traveling.

Figure 6A:
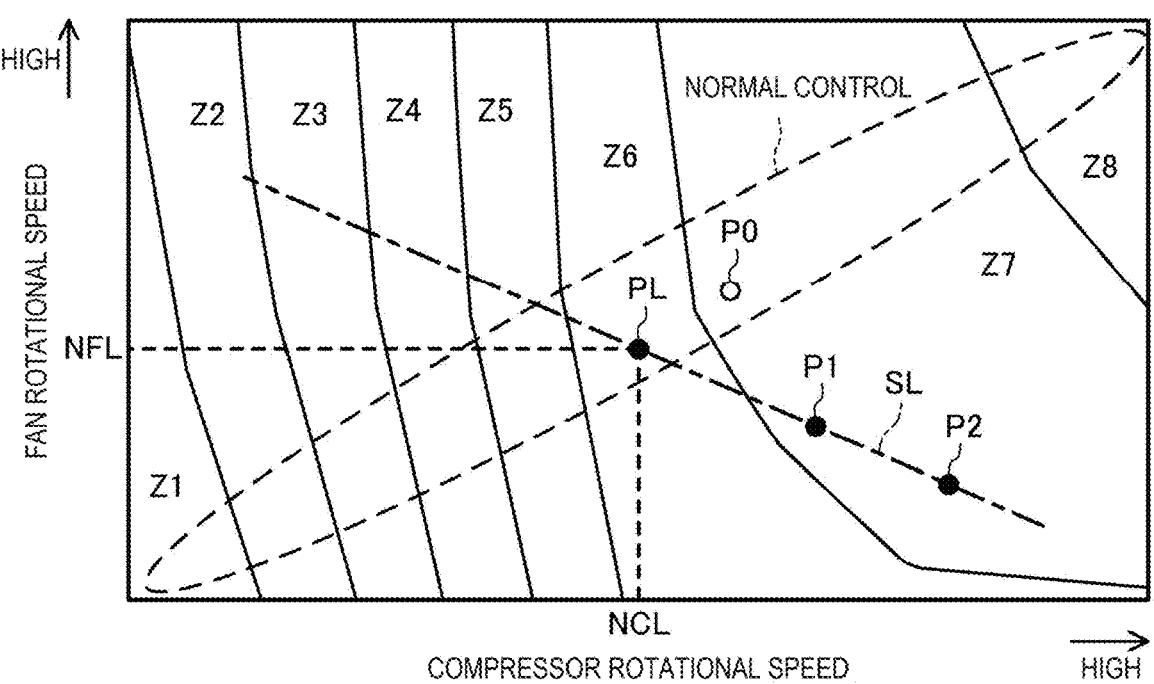

In view of the above, conventionally, a compressor rotational speed limit NCL and a fan rotational speed limit NFL are set in advance based on a predetermined noise regulation values and, when at least one of a set compressor rotational speed and a set fan rotational speed that are a compressor rotational speed and a fan rotational speed set based on the required cooling capability, is larger than the compressor rotational speed limit NCL or the fan rotational speed limit NFL, the compressor 3 and the fan 41 are respectively actuated at the compressor rotational speed limit NCL and the fan rotational speed limit NFL. Assume that, as shown in FIG. 6A, for example, a combination of the set compressor rotational speed and the set fan rotational speed (hereinafter referred to as "required actuation point P0") is located at the upper right of a combination of the compressor rotational speed limit NCL and the fan rotational speed limit NFL (hereinafter referred to as "actuation point limit PL"). In the conventional control, the required actuation point P0 is corrected to the actuation point limit PL, and the compressor 3 and the fan 41 are then actuated at the compressor rotational speed limit NCL and the fan rotational speed limit NFL.

However, as shown in FIG. 6A, in the conventional control, the actuation point is moved from the region Z7 to the region Z6, so that the cooling capability decreases. A decrease in the cooling capability may reduce charging efficiency of the battery module 70, may promote deterioration of the drive motor 102, and may reduce cooling efficiency of air conditioning in the vehicle cabin.

Thus, in the embodiment 1, an actuation point is calculated at which a noise level indicating a magnitude of noise is equal to or less than the noise level at the actuation point limit PL (that is, noise regulation value), and a decrease in the cooling capability can be suppressed. To be more specific, when at least one of a first condition that the set compressor rotational speed is equal to or less than the compressor rotational speed limit NCL and a second condition that the set fan rotational speed is equal to or less than the fan rotational speed limit NFL is not satisfied, the cooling system ECM 80 performs noise suppression control where a corrected compressor rotational speed is set such that a noise level becomes equal to or less than the noise regulation value, and a corrected fan rotational speed is set based on the corrected compressor rotational speed. Particularly, in the noise suppression control, a lower corrected fan rotational speed is set for a higher corrected compressor rotational speed.

As described above, the fan rotational speed is set basically based on the detected result from the second coolant pressure sensor SW3. A higher compressor rotational speed causes a higher detected result (pressure of coolant) and hence, basically, a higher fan rotational speed is set for a higher compressor rotational speed. That is, in normal control, as shown by a broken line in FIG. 6A, combinations of the compressor rotational speed and the fan rotational speed are set within a range extending from the lower left portion to the upper right portion of the cooling capability map. However, as shown in FIG. 4, FIG. 5, and FIG. 6A, in practice, combinations that bring about substantially the same cooling capability are also present outside the range of the normal control. Therefore, by setting the fan rotational speed without depending on the pressure of coolant, it is possible to set an actuation point at which high cooling capability can be maintained and noise level can be suppressed.

In the embodiment 1, particularly for combinations of the compressor rotational speed and the fan rotational speed at which a noise level reaches the noise regulation value (hereinafter referred to as "actuation point candidates"), the cooling system ECM 80 obtains the cooling capabilities that are exhibited when the compressor 3 and the fan 41 are actuated at respective actuation point candidates. Of the respective actuation point candidates, the cooling system ECM 80 selects, as a corrected actuation point, an actuation point candidate having the cooling capability closest to the required cooling capability, and sets the compressor rotational speed and the fan rotational speed at the selected corrected actuation point as the corrected compressor rotational speed and the corrected fan rotational speed, respectively. By selecting a corrected actuation point at which the noise level reaches the noise regulation value, it is possible to set the compressor rotational speed and the fan rotational speed to as high values as possible. Therefore, the high cooling capability can be readily maintained. An actuation point candidate and the cooling capability at each actuation point candidate may be obtained by calculation by the cooling system ECM 80, or may be obtained in such a manner that an actuation point candidate and the cooling capability at each actuation point candidate are stored in advance in the memory 80b for each cooling capability map in the form of a map 500, which will be described later, and the cooling system ECM 80 reads an appropriate map based on the temperature of outside air. The description "the cooling capability closest to the required cooling capability" includes the case where the cooling capability is equal to the required cooling capability. When there is an actuation point candidate having the cooling capability equal to the required cooling capability, such an actuation point candidate is the actuation point candidate having the cooling capability closest to the required cooling capability.

A higher compressor rotational speed and a higher fan rotational speed cause a higher noise level. Therefore, as shown in FIG. 6A, actuation points at which a noise level reaches the noise regulation value are located on a downward-sloping straight line (hereinafter referred to as "noise regulation line SL") expressing that a higher compressor rotational speed causes a lower fan rotational speed. This noise regulation line SL is obtained by setting a fan rotational speed based on compressor rotational speed such that not the pressure of coolant but a noise level reaches the noise regulation value. Although the upper left portion and the lower right portion of the noise regulation line SL are cut in FIG. 6A, this is mainly caused by the operating limit of the compressor 3. The upper limit value of the compressor rotational speed is set based on the upper limit pressure of the operation of the compressor 3, and the lower limit value of the compressor rotational speed is set based on the rotational speed at which an abnormal operation, such as choking, does not occur. The noise regulation line SL is set based on the noise regulation value. For example, when the noise regulation value is 20 decibels, the noise regulation line on which a noise level is 20 decibels is set. This noise regulation value can be arbitrarily set.

Figure 6B:
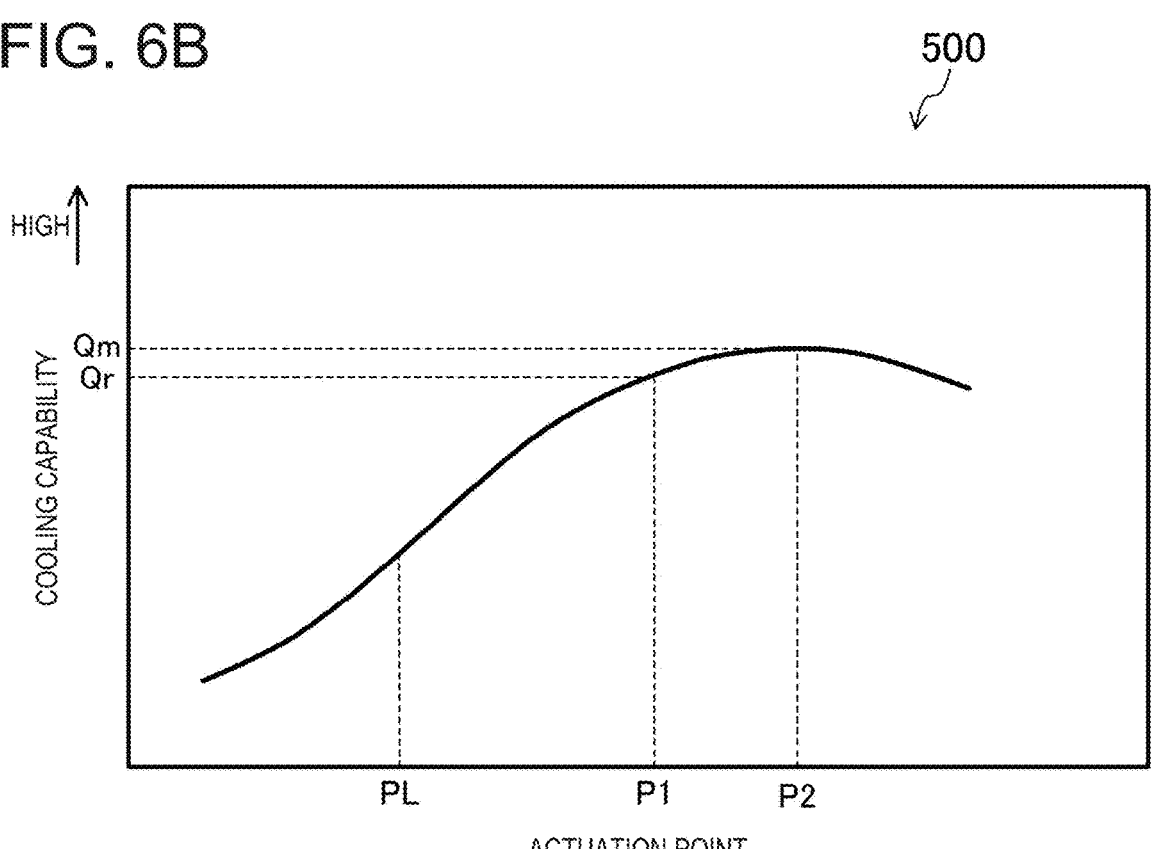

In FIG. 6B is the map 500 showing the cooling capability on the noise regulation line SL. In the map 500, position of actuation point is shown on the horizontal axis, and the cooling capability is shown on the vertical axis. On the horizontal axis, an actuation point having a lower compressor rotational speed and a higher fan rotational speed is closer to the left side, and an actuation point having a higher compressor rotational speed and a lower fan rotational speed is closer to the right side. The actuation point limit PL, an actuation point candidate P1, and an actuation point candidate P2 respectively correspond to PL, P1, and P2 in FIG. 6A.

As shown in the map 500, on the noise regulation line SL, the cooling capability becomes equal to the required cooling capability (Qr in FIG. 6B) at the actuation point candidate P1. On the noise regulation line SL, the cooling capability reaches the maximum cooling capability (Qm in FIG. 6B) at the actuation point candidate P2. When there is an actuation point candidate where the cooling capability is equal to the required cooling capability, the cooling system ECM 80 sets such an actuation point candidate as a corrected actuation point. In the present embodiment, the cooling system ECM 80 sets the actuation point candidate P1 as a corrected actuation point, and sets the compressor rotational speed and the fan rotational speed at the actuation point candidate P1 as a corrected compressor rotational speed and a corrected fan rotational speed, respectively. This is because that although the cooling capability at the actuation point candidate P2 is higher than that at the actuation point candidate P1, when an actuation point having the cooling capability equal to or more than the required cooling capability is selected, there is a possibility of a reduction in cooling efficiency.

When there is no actuation point candidate having the cooling capability equal to the required cooling capability due to the required cooling capability larger than the maximum cooling capability, the cooling system ECM 80 sets, as a corrected actuation point, the actuation point candidate having the cooling capability closest to the required cooling capability, that is, an actuation point candidate having the maximum cooling capability (the actuation point candidate P2 in this case). Further, when there are a plurality of corrected actuation points having the cooling capability equal to the required cooling capability, the cooling system ECM 80 selects, as a corrected actuation point, an actuation point candidate having a lower compressor rotational speed. This is because, from the viewpoint of cooling efficiency, the cooling efficiency is higher when the compressor rotational speed is as low as possible and the fan rotational speed is as high as possible.

Figure 7:
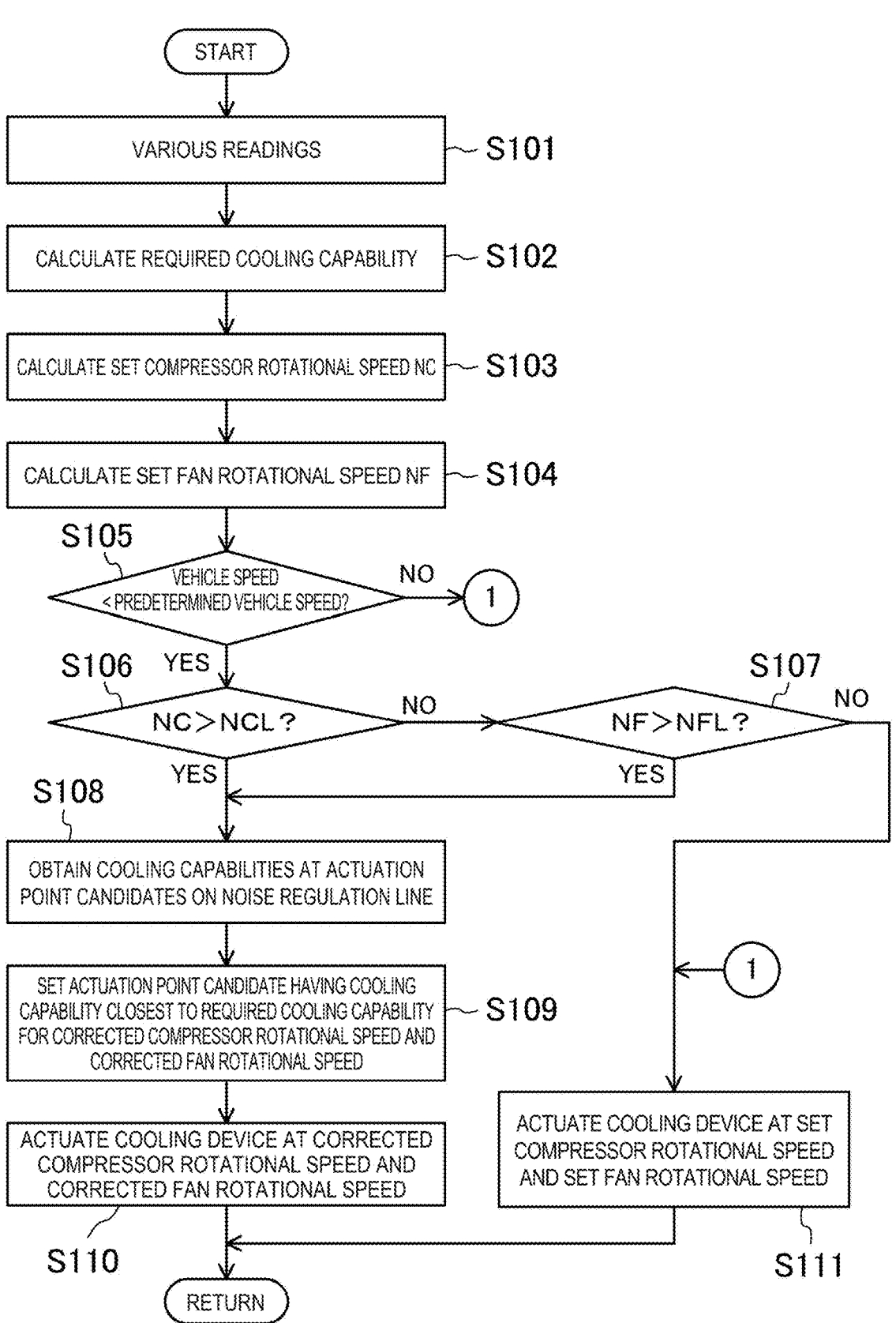
FIG. 7 is a flowchart showing a processing operation of a cooling system electric control module (ECM).

FIG. 7 is a flowchart showing a processing operation of the cooling system ECM 80 in performing noise suppression control. This flowchart is performed for every predetermined number of cycles.

First, in step S101, the cooling system ECM 80 receives and reads signals from various sensors SW1 to SW7, the PCM 81, and the BECM 82.

Next, in step S102, the cooling system ECM 80 calculates the required cooling capability.

Then, in step S103, the cooling system ECM 80 calculates a set compressor rotational speed NC based on the required cooling capability.

Then, in step S104, the cooling system ECM 80 calculates a set fan rotational speed NF based on the detected result from the second coolant pressure sensor SW3.

Then, in step S105, the cooling system ECM 80 determines whether a vehicle speed is less than a predetermined vehicle speed. In the case where a vehicle speed is high, large road noise is generated and hence, even when noise of a magnitude equal to or more than the noise regulation value is generated from the cooling device 1, the occupant of the vehicle 100 is less likely to feel annoyance. Therefore, when the vehicle speed is high, the cooling system ECM 80 does not perform noise suppression control. When the vehicle speed is less than the predetermined vehicle speed, that is, the determination is YES, the cooling system ECM 80 advances to step S106. In contrast, when the vehicle speed is equal to or more than the predetermined vehicle speed, that is, the determination is NO, the cooling system ECM 80 advances to step S111. The predetermined vehicle speed is a speed at which road noise of a magnitude equal to or more than the noise regulation value is generated, and the predetermined vehicle speed may be set to 20 km/h, for example.

Then, in step S106, the cooling system ECM 80 determines whether the set compressor rotational speed NC is larger than the compressor rotational speed limit NCL. When the determination is that the set compressor rotational speed NC is larger than the compressor rotational speed limit NCL, that is, YES, the cooling system ECM 80 advances to step S108. In contrast, when the determination is that the set compressor rotational speed NC is equal to or less than the compressor rotational speed limit NCL, that is, NO, the cooling system ECM 80 advances to step S107.

In step S107, the cooling system ECM 80 determines whether the set fan rotational speed NF is large than the fan rotational speed limit NFL. When the determination is that the set fan rotational speed NF is larger than the fan rotational speed limit NFL, that is, YES, the cooling system ECM 80 advances to step S108. In contrast, when the determination is that the set fan rotational speed NF is equal to or less than the fan rotational speed limit NFL, that is, NO, the cooling system ECM 80 advances to step S111.

In the step S108, the cooling system ECM 80 obtains the cooling capabilities at respective actuation point candidates on the noise regulation line SL.

Then, in step S109, the cooling system ECM 80 sets, as a corrected actuation point, the actuation point candidate having the cooling capability closest to the required cooling capability, and sets the compressor rotational speed and the fan rotational speed at the corrected actuation point as a corrected compressor rotational speed and a corrected fan rotational speed. When there is an actuation point candidate having the cooling capability equal to the required cooling capability, the cooling system ECM 80 sets this actuation point candidate as a corrected actuation point. When there are a plurality of actuation point candidates having the cooling capability closest to the required cooling capability, the cooling system ECM 80 sets, as a corrected actuation point, an actuation point candidate having the lowest compressor rotational speed.

Then, in step S110, the cooling system ECM 80 actuates the cooling device 1 at the corrected compressor rotational speed and the corrected fan rotational speed. The process returns after step S110.

On the other hand, in the step S111, the cooling system ECM 80 actuates the cooling device 1 at the set compressor rotational speed and the set fan rotational speed. The process returns after step S111.

Advantageous Effect of Embodiment 1

Accordingly, in the embodiment 1, the cooling device includes the compressor 3 that compresses a coolant, the fan 41 that draws outside air into the condenser 4 that condenses, by cooling, the coolant compressed by the compressor 3, the battery temperature sensor SW1 that detects the temperature of the battery module 70, the motor water temperature sensor SW5 that detects the temperature of the drive motor 102, the second coolant pressure sensor SW 3 that detects the pressure of the coolant compressed by the compressor 3, and the cooling system ECM 80 that controls the compressor 3 and the fan 41. The cooling system ECM 80 calculates the required cooling capability at least based on the detected results from the battery temperature sensor SW1 and the motor water temperature sensor SW5. The cooling system ECM 80 calculates the set compressor rotational speed, which is the rotational speed of the compressor 3 based on the required cooling capability. The cooling system ECM 80 calculates the set fan rotational speed, which is the rotational speed of the fan 41 based on the detected result from the second coolant pressure sensor SW3, when both of the first condition that the set compressor rotational speed is equal to or less than the compressor rotational speed limit NCL set in advance based on the predetermined noise regulation value and the second condition that the set fan rotational speed is equal to or less than the fan rotational speed limit NFL set in advance based on the predetermined noise regulation value are satisfied. The cooling system ECM 80 actuates the compressor 3 and the fan 41 at the set compressor rotational speed and the set fan rotational speed respectively, but when at least one of first condition and the second condition is not satisfied, the cooling system ECM 80 sets a corrected compressor rotational speed such that noise generated with actuation of the compressor 3 and the fan 41 reaches the predetermined noise regulation value or less, and the cooling system ECM 80 sets a corrected fan rotational speed based on the corrected compressor rotational speed, and actuates the compressor 3 and the fan 41 at the corrected compressor rotational speed and the corrected fan rotational speed respectively, and the cooling system ECM 80 sets a lower value of the corrected fan rotational speed for a higher corrected compressor rotational speed. As described above, by setting the fan rotational speed not based on the pressure of coolant but based on the compressor rotational speed such that a higher compressor rotational speed causes a lower fan rotational speed, it is possible to suppress noise during cooling while a decrease in the cooling capability is suppressed as much as possible.

In the embodiment 1, the cooling device further includes the outside air temperature sensor SW4 that detects the temperature of outside air, and the cooling system ECM 80 sets the corrected compressor rotational speed and the corrected fan rotational speed by further taking into account the temperature of outside air. With such a configuration, the temperature of air drawn by the fan can be taken into account and hence, it is possible to set a more appropriate corrected fan rotational speed that can suppress a decrease in the cooling capability as much as possible. Accordingly, it is possible to suppress a decrease in the cooling capability more effectively.

In the embodiment 1, the cooling system ECM 80 sets the corrected compressor rotational speed and the corrected fan rotational speed such that the generated noise reaches the noise regulation value. With such a configuration, the corrected compressor rotational speed and the corrected fan rotational speed can be set to as high values as possible. Therefore, it is possible to suppress a decrease in the cooling capability more effectively.

In the embodiment 1, for a plurality of combinations of the compressor rotational speed and the fan rotational speed at which the generated noise reaches the noise regulation value, the cooling system ECM 80 obtains the cooling capabilities, and the cooling system ECM 80 sets a combination having the cooling capability closest to the required cooling capability for the corrected compressor rotational speed and the corrected fan rotational speed. With such a configuration, an appropriate corrected compressor rotational speed and an appropriate corrected fan rotational speed can be set within a range where noise can be suppressed. Accordingly, it is possible to suppress noise during cooling while a decrease in the cooling capability is suppressed more effectively.

In the embodiment 1, when the combination includes a plurality of combinations having the cooling capability equal to or closest to the required cooling capability, the cooling system ECM 80 sets a combination having the lowest compressor rotational speed for the corrected compressor rotational speed and the corrected fan rotational speed. With such a configuration, it is possible to set the compressor rotational speed to as low a value as possible. A lower compressor rotational speed requires a smaller amount of coolant to be cooled and hence, it is possible to efficiently cool the coolant. Therefore, it is possible to enhance cooling efficiency.

Embodiment 2

Hereinafter, an embodiment 2 will be described in detail with reference to drawings. In the description made hereinafter, components identical to the corresponding components in the embodiment 1 are given the same reference symbols, and the detailed description of such components will be omitted.

Figure 8:
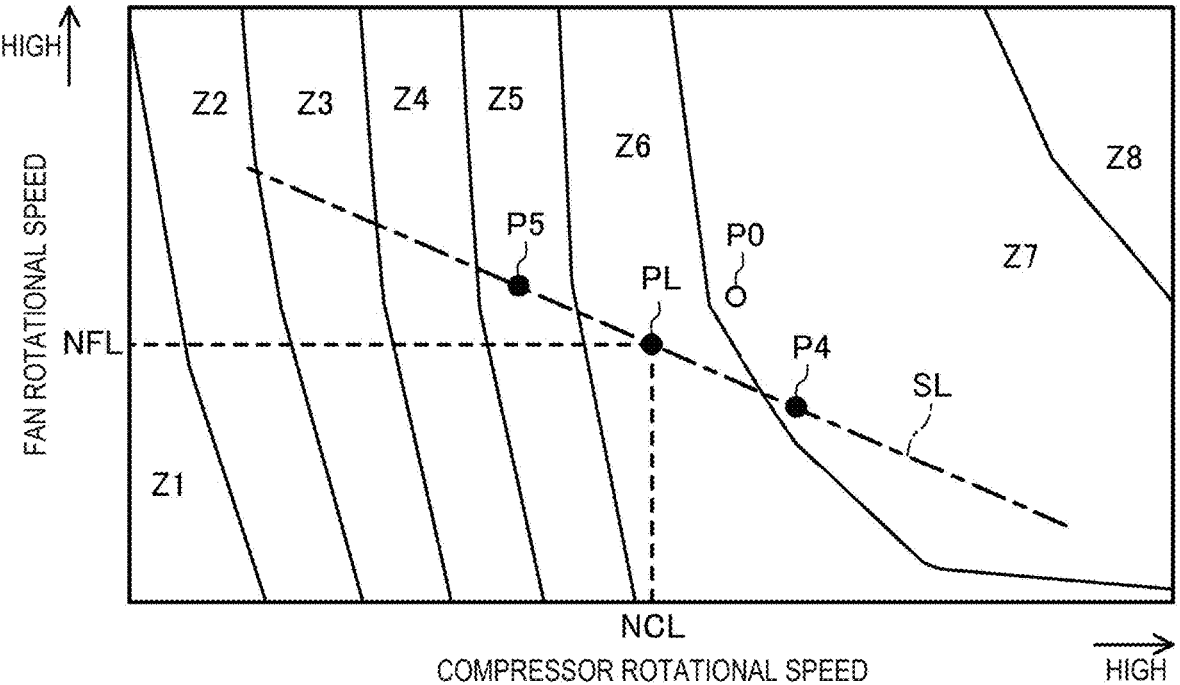
FIG. 8 is a diagram schematically showing a method for calculating a corrected compressor rotational speed and a corrected fan rotational speed for a cooling device according to an embodiment 2.

FIG. 8 schematically shows a method for calculating a corrected actuation point for a cooling device according to the embodiment 2. In the embodiment 2, when at least one of a first condition that the set compressor rotational speed is equal to or less than the compressor rotational speed limit NCL and a second condition that the set fan rotational speed is equal to or less than the fan rotational speed limit NFL is not satisfied, the cooling system ECM 80 calculates a first compressor rotational speed candidate, a first fan rotational speed candidate, a second compressor rotational speed candidate, and a second fan rotational speed candidate, the first compressor rotational speed candidate being higher than the compressor rotational speed limit NCL by a fixed rotational speed, the first fan rotational speed candidate being based on the first compressor rotational speed candidate, the second compressor rotational speed candidate being lower than the compressor rotational speed limit NCL by the fixed rotational speed, the second fan rotational speed candidate being based on the second compressor rotational speed candidate. Next, for the actuation point limit PL, being a combination of the compressor rotational speed limit NCL and the fan rotational speed limit NFL, a first actuation point candidate P4, being a combination of the first compressor rotational speed candidate and the first fan rotational speed candidate, and a second actuation point candidate P5, being a combination of the second compressor rotational speed candidate and the second fan rotational speed candidate, the cooling system ECM 80 obtains the cooling capabilities that are exhibited when the compressor 3 and the fan 41 are actuated at the respective actuation points. Then, of the respective actuation points, the cooling system ECM 80 selects, as a corrected actuation point, the actuation point having the cooling capability closest to the required cooling capability, and sets the compressor rotational speed and the fan rotational speed at the corrected actuation point as a corrected compressor rotational speed and a corrected fan rotational speed, respectively. That is, the actuation point limit PL is also one of actuation point candidates.

As shown in FIG. 8, in the embodiment 2, the cooling system ECM 80 calculates the first actuation point candidate P4 and the second actuation point candidate P5 from the noise regulation line SL. That is, the first fan rotational speed candidate is lower than the fan rotational speed limit NFL, and the second fan rotational speed candidate is higher than the fan rotational speed limit NFL. The absolute value of the difference between the first compressor rotational speed candidate and the compressor rotational speed limit NCL and the absolute value of the difference between the second compressor rotational speed candidate and the compressor rotational speed limit NCL are the same fixed value and hence, the absolute value of the difference between the first fan rotational speed candidate and the fan rotational speed limit NFL is equal to the absolute value of the difference between the second fan rotational speed candidate and the fan rotational speed limit NFL. The fixed value is set in advance.

In the example shown in FIG. 8, the cooling capability at the first actuation point candidate P4 is closest to the required cooling capability and hence, the first actuation point candidate P4 is selected as a corrected actuation point. When there are two actuation point candidates having the cooling capability closest to the required cooling capability, and when the cooling capability at one actuation point candidate is lower than the required cooling capability, and the cooling capability at the other actuation point candidate is higher than the required cooling capability, the cooling system ECM 80 selects, as a corrected actuation point, an actuation point candidate having the cooling capability higher than the required cooling capability.

Figure 9:
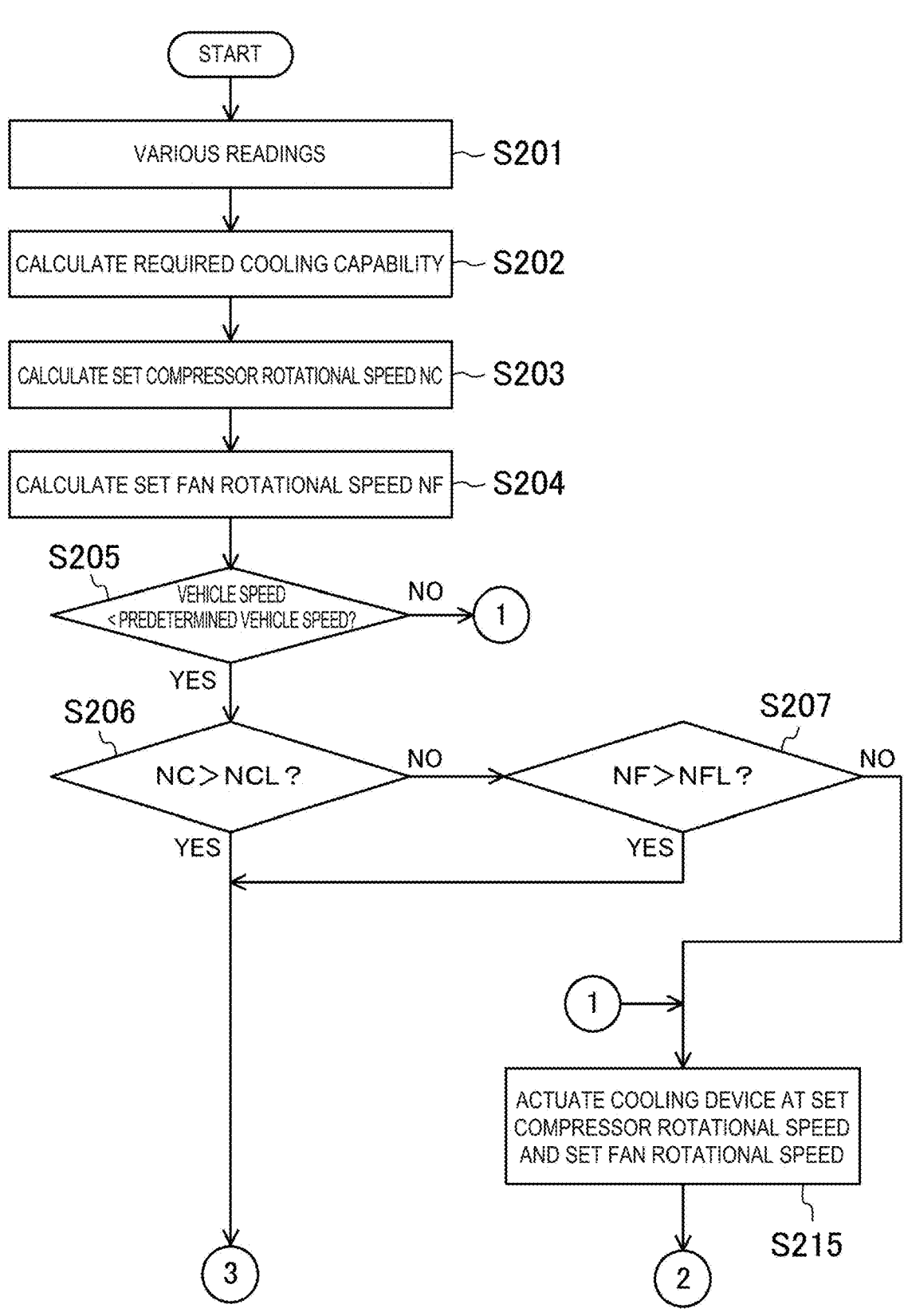
FIG. 9 shows a portion of a flowchart showing a processing operation of a cooling system ECM of the cooling device according to the embodiment 2.
Figure 10:
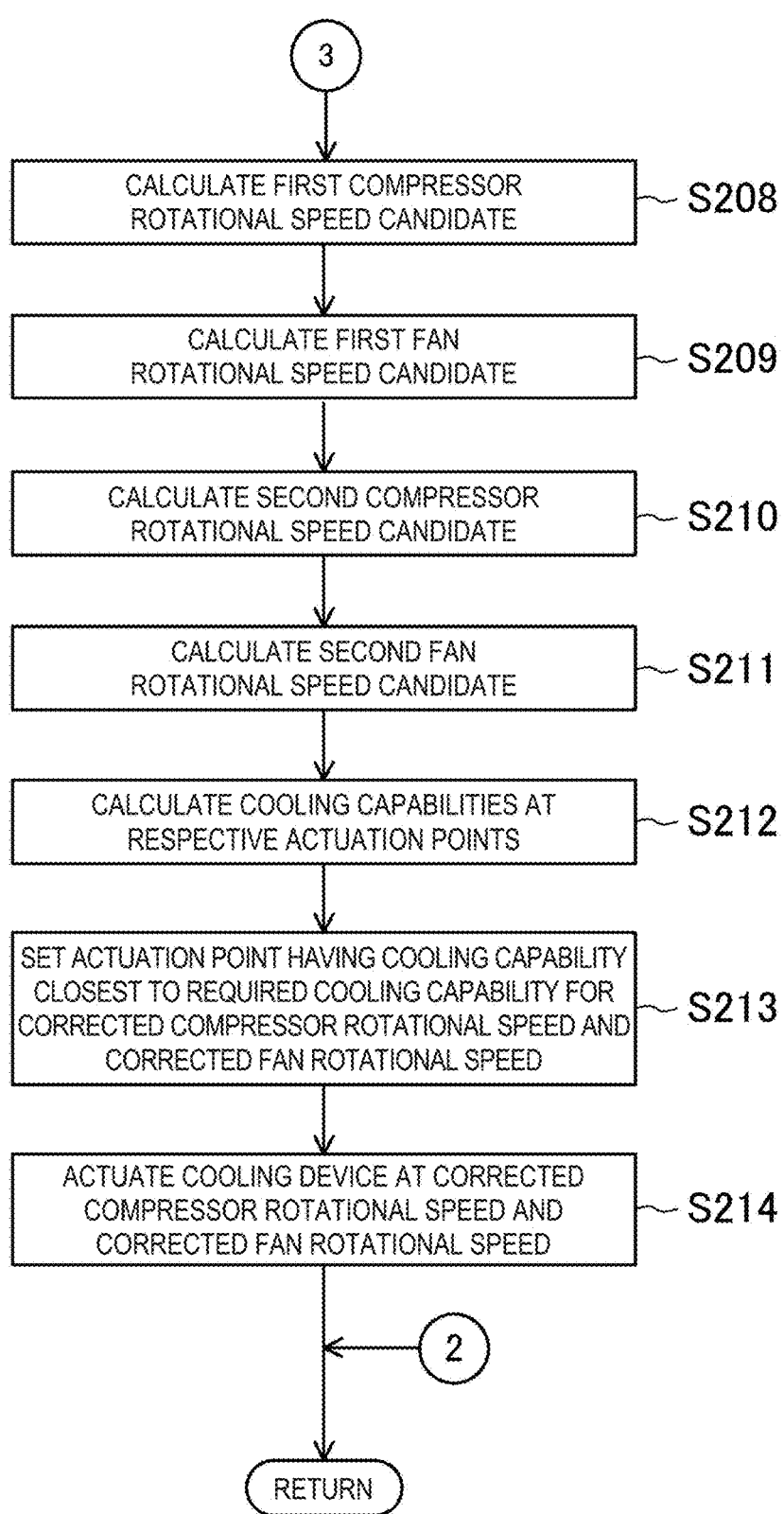
FIG. 10 shows a remaining portion of the flowchart showing the processing operation of the cooling system ECM of the cooling device according to the embodiment 2.

FIG. 9 and FIG. 10 show a flowchart showing a processing operation of the cooling system ECM 80 in performing noise suppression control according to the embodiment 2. This flowchart is performed for every predetermined number of cycles.

First, in step S201, the cooling system ECM 80 receives and reads signals from various sensors SW1 to SW7, the PCM 81, and the BECM 82.

Next, in step S202, the cooling system ECM 80 calculates the required cooling capability.

Then, in step S203, the cooling system ECM 80 calculates a set compressor rotational speed NC based on the required cooling capability.

Then, in step S204, the cooling system ECM 80 calculates a set fan rotational speed NF based on the detected result from the second coolant pressure sensor SW3.

Then, in step S205, the cooling system ECM 80 determines whether a vehicle speed is less than a predetermined vehicle speed. When the determination is that the vehicle speed is less than the predetermined vehicle speed, that is, YES, the cooling system ECM 80 advances to step S206. In contrast, when the determination is that the vehicle speed is equal to or more than the predetermined vehicle speed, that is, NO, the cooling system ECM 80 advances to step S215.

Then, in step S206, the cooling system ECM 80 determines whether the set compressor rotational speed NC is larger than the compressor rotational speed limit NCL. When the determination is that the set compressor rotational speed NC is larger than the compressor rotational speed limit NCL, that is, YES, the cooling system ECM 80 advances to step S208. In contrast, when the determination is that the set compressor rotational speed NC is equal to or less than the compressor rotational speed limit NCL, that is, NO, the cooling system ECM 80 advances to step S207.

In the step S207, the cooling system ECM 80 determines whether the set fan rotational speed NF is larger than the fan rotational speed limit NFL. When the determination is that the set fan rotational speed NF is larger than the fan rotational speed limit NFL, that is, YES, the cooling system ECM 80 advances to step S208. In contrast, when the determination is that the set fan rotational speed NF is equal to or less than the fan rotational speed limit NFL, that is, NO, the cooling system ECM 80 advances to step S215.

In the step S208, the cooling system ECM 80 calculates a first compressor rotational speed candidate.

Then, in step S209, the cooling system ECM 80 calculates a first fan rotational speed candidate based on the first compressor rotational speed candidate.

Then, in step S210, the cooling system ECM 80 calculates a second compressor rotational speed candidate.

Then, in step S211, the cooling system ECM 80 calculates a second fan rotational speed candidate based on the second compressor rotational speed candidate.

Then, in step S212, the cooling system ECM 80 calculates the cooling capabilities at the actuation point limit PL, the first actuation point candidate P4, and the second actuation point candidate P5.

Then, in step S213, the cooling system ECM 80 sets an actuation point closest to the required cooling capability as a corrected actuation point, and sets the compressor rotational speed and the fan rotational speed at this actuation point as a corrected compressor rotational speed and a corrected fan rotational speed.

Then, in step S214, the cooling system ECM 80 actuates the cooling device 1 at the corrected compressor rotational speed and the corrected fan rotational speed. The process returns after step S214.

On the other hand, in the step S215, the cooling system ECM 80 actuates the cooling device 1 at the set compressor rotational speed and the set fan rotational speed. The process returns after step S215.

Also in the configuration of the embodiment 2, the fan rotational speed is set based on the compressor rotational speed and hence, it is possible to suppress noise while a decrease in the cooling capability is suppressed as much as possible. It is also possible to reduce the amount of arithmetic operation of the cooling system ECM 80 as much as possible. Consequently, it is possible to reduce power consumption as much as possible.

Another Embodiment

The technique disclosed herein is not limited to the above-described embodiments, and substitutions may be made without departing from the gist of the claims.

For example, the above-described embodiments 1 and 2 adopt the configuration in which the corrected actuation points are set on the noise regulation line SL. However, this is not restrictive, and corrected actuation points need not be set on the noise regulation line SL and may be set within a region below the noise regulation line SL in the cooling capability map.

In the above-described embodiments 1 and 2, when at least one of the first condition and the second condition is not satisfied, until a corrected actuation point is selected, the set compressor rotational speed and the set fan rotational speed are respectively set as the compressor rotational speed and the fan rotational speed. However, this is not restrictive, and when at least one of the first condition and the second condition is not satisfied, until a corrected actuation point is selected, the compressor rotational speed limit NCL and the fan rotational speed limit NFL may be respectively temporarily set as the compressor rotational speed and the fan rotational speed.

In the above-described embodiment 2, only three actuation point candidates including the actuation point limit PL are obtained. However, this is not restrictive, and the number of actuation point candidates may be four or more.

In the above-described embodiments 1 and 2, the cooling device 1 cools the battery module 70 by causing coolant to flow through the heat exchanger 2. However, this is not restrictive, and the cooling device 1 may further include a heat exchanger (chiller), in the heat exchanger 2, for causing cooling water subjected to heat exchange with coolant to flow through the heat exchanger.

The above-described embodiments are merely for example, and the scope of the present disclosure should not be considered limiting. The scope of the present disclosure is defined by the claims, and all modifications and changes belonging to the equivalent range of the claims fall within the range of the present disclosure.

Industrial Applicability

The technique disclosed herein can be effectively used as a cooling device for an electrically driven vehicle, the cooling device cooling, by utilizing coolant, electric drive parts mounted on a vehicle.

Description of Reference Characters

1 cooling device
2 battery heat exchanger
3 compressor (compressor)
4 condenser (condensing device)
41 fan
70 battery module (electric drive part)
80 cooling system ECM (controller)
100 vehicle
102 drive motor (electric drive part)
103 inverter (electric drive part)
104 converter (electric drive part)
SW1 battery temperature sensor (electric drive part temperature detector)
SW3 second coolant pressure sensor (coolant pressure detector)
SW4 outside air temperature sensor (outside air temperature detector)
SW5 motor water temperature sensor (electric drive part temperature detector)

The invention claimed is:

1. A cooling device for an electrically driven vehicle, the cooling device configured to cool, by utilizing a coolant, an electric drive part mounted on a vehicle, the cooling device comprising:
   a compressor that compresses the coolant;
   a fan that draws outside air into a condensing device that condenses, by cooling, the coolant compressed by the compressor;
   an electric drive part temperature detector that detects a temperature of the electric drive part;

a coolant pressure detector that detects a pressure of the coolant compressed by the compressor; and a controller that controls the compressor and the fan, wherein the controller:

calculates a required cooling capability at least based on a detected result from the electric drive part temperature detector, calculates a set compressor rotational speed, which is a rotational speed of the compressor based on the required cooling capability, and calculates a set fan rotational speed, which is a rotational speed of the fan based on a detected result from the coolant pressure detector, wherein when both of a first condition that the set compressor rotational speed is equal to or less than a compressor rotational speed limit set in advance based on a predetermined noise regulation value and a second condition that the set fan rotational speed is equal to or less than a fan rotational speed limit set in advance based on the predetermined noise regulation value are satisfied, the controller actuates the compressor and the fan at the set compressor rotational speed and the set fan rotational speed, respectively, wherein when at least one of the first condition and the second condition is not satisfied, the controller sets a corrected compressor rotational speed such that noise generated with actuation of the compressor and the fan reaches the predetermined noise regulation value or less, and the controller sets a corrected fan rotational speed based on the corrected compressor rotational speed, and actuates the compressor and the fan at the corrected compressor rotational speed and the corrected fan rotational speed, respectively, and wherein the controller sets a lower value of the corrected fan rotational speed for a higher corrected compressor rotational speed, wherein the controller sets the corrected compressor rotational speed and the corrected fan rotational speed such that the generated noise reaches the predetermined noise regulation value.

2. The cooling device according to claim 1, further comprising an outside air temperature detector that detects a temperature of the outside air, wherein the controller sets the corrected compressor rotational speed and the corrected fan rotational speed by further taking into account the temperature of the outside air.

3. The cooling device according to claim 1, wherein for a plurality of combinations of the rotational speed of the compressor and the rotational speed of the fan at which the generated noise reaches the predetermined noise regulation value, the controller obtains cooling capabilities and sets a combination, among the plurality of combinations, having a cooling capability closest to the required cooling capability for the corrected compressor rotational speed and the corrected fan rotational speed.

4. The cooling device according to claim 2, wherein for a plurality of combinations of the rotational speed of the compressor and the rotational speed of the fan at which the generated noise reaches the predetermined noise regulation value, the controller obtains cooling capabilities and sets a combination, among the plurality of combinations, having a cooling capability closest to the required cooling capability for the corrected compressor rotational speed and the corrected fan rotational speed.

5. The cooling device according to claim 3, wherein when the combination includes more than one combination having the cooling capability closest to the required cooling capability, the controller sets a combination, among the more than one combination, having a lowest rotational speed of the compressor for the corrected compressor rotational speed and the corrected fan rotational speed.

6. The cooling device according to claim 4, wherein when the combination includes more than one combination having the cooling capability closest to the required cooling capability, the controller sets a combination, among the more than one combination, having a lowest rotational speed of the compressor for the corrected compressor rotational speed and the corrected fan rotational speed.

7. The cooling device according to claim 1, wherein the controller:

calculates a first compressor rotational speed candidate and a first fan rotational speed candidate, the first compressor rotational speed candidate being higher than the compressor rotational speed limit by a fixed rotational speed, the first fan rotational speed candidate being based on the first compressor rotational speed candidate, and calculates a second compressor rotational speed candidate and a second fan rotational speed candidate, the second compressor rotational speed candidate being lower than the compressor rotational speed limit by the fixed rotational speed, the second fan rotational speed candidate being based on the second compressor rotational speed candidate, and wherein for a first combination of the compressor rotational speed limit and the fan rotational speed limit, a second combination of the first compressor rotational speed candidate and the first fan rotational speed candidate, and a third combination of the second compressor rotational speed candidate and the second fan rotational speed candidate, the controller obtains cooling capabilities and the controller sets a combination, among the first, second, and third combinations, having a cooling capability closest to the required cooling capability for the corrected compressor rotational speed and the corrected fan rotational speed.

8. The cooling device according to claim 2, wherein the controller:

calculates a first compressor rotational speed candidate and a first fan rotational speed candidate, the first compressor rotational speed candidate being higher than the compressor rotational speed limit by a fixed rotational speed, the first fan rotational speed candidate being based on the first compressor rotational speed candidate, and calculates a second compressor rotational speed candidate and a second fan rotational speed candidate, the second compressor rotational speed candidate being lower than the compressor rotational speed limit by the fixed rotational speed, the second fan rotational speed candidate being based on the second compressor rotational speed candidate, and wherein for a first combination of the compressor rotational speed limit and the fan rotational speed limit, a second combination of the first compressor rotational speed candidate and the first fan rotational speed candidate, and a third combination of the second compressor rotational speed candidate and the second fan rotational speed candidate, the controller obtains cooling capabilities and the controller sets a combination, among the first, second, and third combinations, having a cooling capability closest to the required cooling capability for the corrected compressor rotational speed and the corrected fan rotational speed.

* * * * *